US012809247B2

(12) United States Patent
O'Brien et al.

(10) Patent No.: US 12,809,247 B2
(45) Date of Patent: Nov. 24, 2026

(54) CAMERA MOUNT FOR A BIRD FEEDER

(71) Applicant: Woodstream Corporation, Lancaster, PA (US)

(72) Inventors: Sean O'Brien, Lancaster, PA (US); Jordan Braightmeyer, Columbia, MD (US)

(73) Assignee: Woodstream Corporation, Lancaster, PA (US)

( * ) Notice: Subject to any disclaimer, the term of this patent is extended or adjusted under 35 U.S.C. 154(b) by 119 days.

(21) Appl. No.: 19/016,195

(22) Filed: Jan. 10, 2025

(65) Prior Publication Data

US 2026/0267212 A1 Sep. 10, 2026

(51) Int. Cl.

| | |
|---|---|
| ***G03B 29/00*** | (2021.01) |
| ***A01K 39/01*** | (2006.01) |
| ***H04N 23/57*** | (2023.01) |

(52) U.S. Cl.

CPC .............. *G03B 29/00* (2013.01); *A01K 39/01* (2013.01); *H04N 23/57* (2023.01)

(58) Field of Classification Search

CPC ........ A01K 3939/01; A01K 3939/0113; G03B 17/02; G03B 17/561; G03B 29/00; H04N 23/51; H04N 23/54; H04N 23/57

USPC ................................................. D30/124, 126

See application file for complete search history.

(56) References Cited

U.S. PATENT DOCUMENTS

| | | | | |
|---|---|---|---|---|
| 9,137,974 | B2 | 9/2015 | Boehm | |
| 9,247,719 | B1 | 2/2016 | Bennett et al. | |
| 10,499,618 | B2 | 12/2019 | Klein | |
| D983,859 | S | 4/2023 | Guan | |
| 11,627,242 | B2 | 4/2023 | Perkins | |
| 11,950,574 | B1 * | 4/2024 | Li | A01K 29/005 |
| 11,985,957 | B1 * | 5/2024 | Li | A01K 29/005 |
| 2012/0233649 | A1 | 9/2012 | Seigler | |
| 2015/0181801 | A1 * | 7/2015 | Niemela | A01C 17/001 119/51.01 |
| 2015/0373945 | A1 | 12/2015 | Sung | |
| 2016/0156989 | A1 | 6/2016 | Lovett | |
| 2023/0027590 | A1 | 1/2023 | Hu | |
| 2023/0148570 | A1 * | 5/2023 | Pekcan | A01K 29/005 119/429 |

OTHER PUBLICATIONS

Bird Buddy Assembly and Mounting, Bird Buddy, 1 page, (URL: https://support.mybirdbuddy.com/hc/en-us/articles/4403603341457-Bird-Buddy-Assembly-and-Mounting).

* cited by examiner

*Primary Examiner* — Daniel M Pasiewicz
(74) *Attorney, Agent, or Firm* — Barley Snyder

(57) ABSTRACT

A camera mount for a bird feeder includes a dock fixed to the bird feeder and a cleat fixed to a camera module and slidable onto the dock in a sliding direction into a connected position. The dock has a detent mechanism including a detent ball and a spring biasing the detent ball into an extended position. The detent ball engages a recess of the cleat in the connected position to releasably fix the cleat and the camera module to the dock.

24 Claims, 15 Drawing Sheets

CAMERA MOUNT FOR A BIRD FEEDER

FIELD OF THE INVENTION

The present invention relates to a bird feeder and, more particularly, to a camera mount for a bird feeder.

BACKGROUND

Bird feeders have long been used to attract a variety of birds, both to provide sustenance to the birds and for the viewing enjoyment of the user who fills and maintains the feeder. More recently, bird feeders have been developed that incorporate a camera into or adjacent to the feeder, which can record an image of a bird feeding at the feeder and provide the image to the user of the feeder.

Cameras in existing bird feeders, however, require tools and hardware to mount and remove. The difficulty in removing the camera from the feeder complicates maintenance or repair of the camera and, in some cases, makes it difficult to replace batteries, charge, or otherwise provide power to the camera. Further, the camera in existing bird feeders can often be pivoted or otherwise moved while mounted in or adjacent to the feeder, which can lead to a user unintentionally selecting suboptimal viewing angles for the birds at the feeder.

SUMMARY

A camera mount for a bird feeder includes a dock fixed to the bird feeder and a cleat fixed to a camera module and slidable onto the dock in a sliding direction into a connected position. The dock has a detent mechanism including a detent ball and a spring biasing the detent ball into an extended position. The detent ball engages a recess of the cleat in the connected position to releasably fix the cleat and the camera module to the dock.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
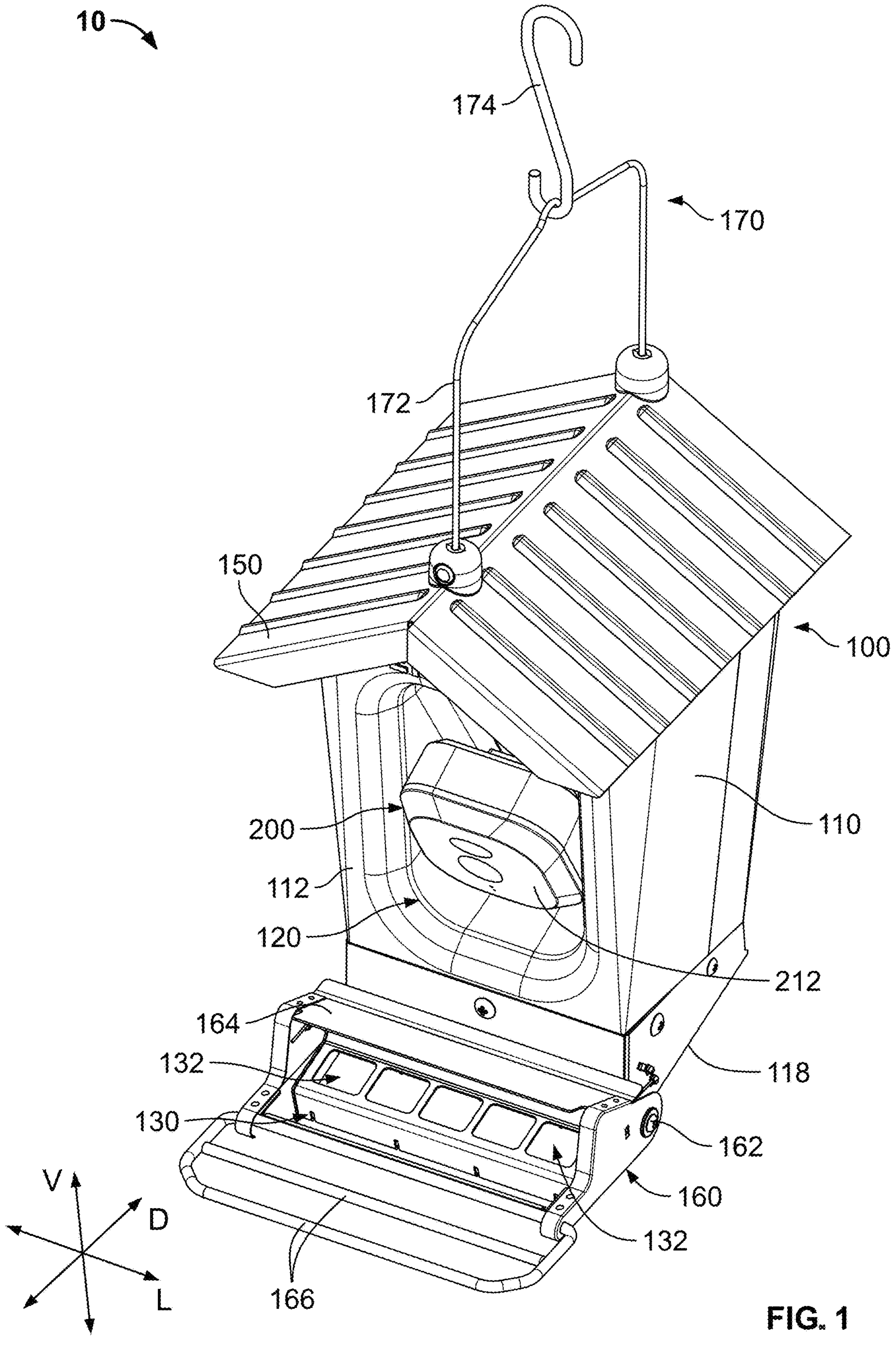
FIG. 1 is a perspective view of a feeder assembly according to an embodiment.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will convey the concept of the invention to those skilled in the art. Moreover, the embodiments and features thereof are only possible configurations in which, however, the individual features as described herein can be provided independently of one another or can be omitted.

Throughout the drawings, only one, multiple, or all of a plurality of identical elements may be labeled in a figure for clarity of the drawings, but the detailed description of the element herein applies equally to each of the identically appearing elements in the figure if all elements are not labeled.

A coordinate system is provided in some of the figures for ease of understanding and should not be construed as limiting the disclosed assembly, device, or elements thereof to any particular orientation. The coordinate system comprises a lateral direction L, a depth direction D perpendicular to the lateral direction L, and a vertical direction V. The vertical direction V is perpendicular to the lateral direction L and the depth direction D. A relative length, width, or thickness of the elements appears throughout the figures; however, the relative length, width, or thickness of the elements are merely illustrative and are not meant to be representative of a particular length, width, or thickness of any of the elements unless stated otherwise herein.

Throughout the specification, the terms "releasably fixable", "removably insertable", or any iteration thereto, is intended to mean that an element is fixable, insertable, or attachable to another element such that a secure connection between the elements is made, but the connection can be undone without the need to take apart a housing and/or the use of tools such as hammers, Allen keys, screwdrivers, drills, etc.

Figure 2:
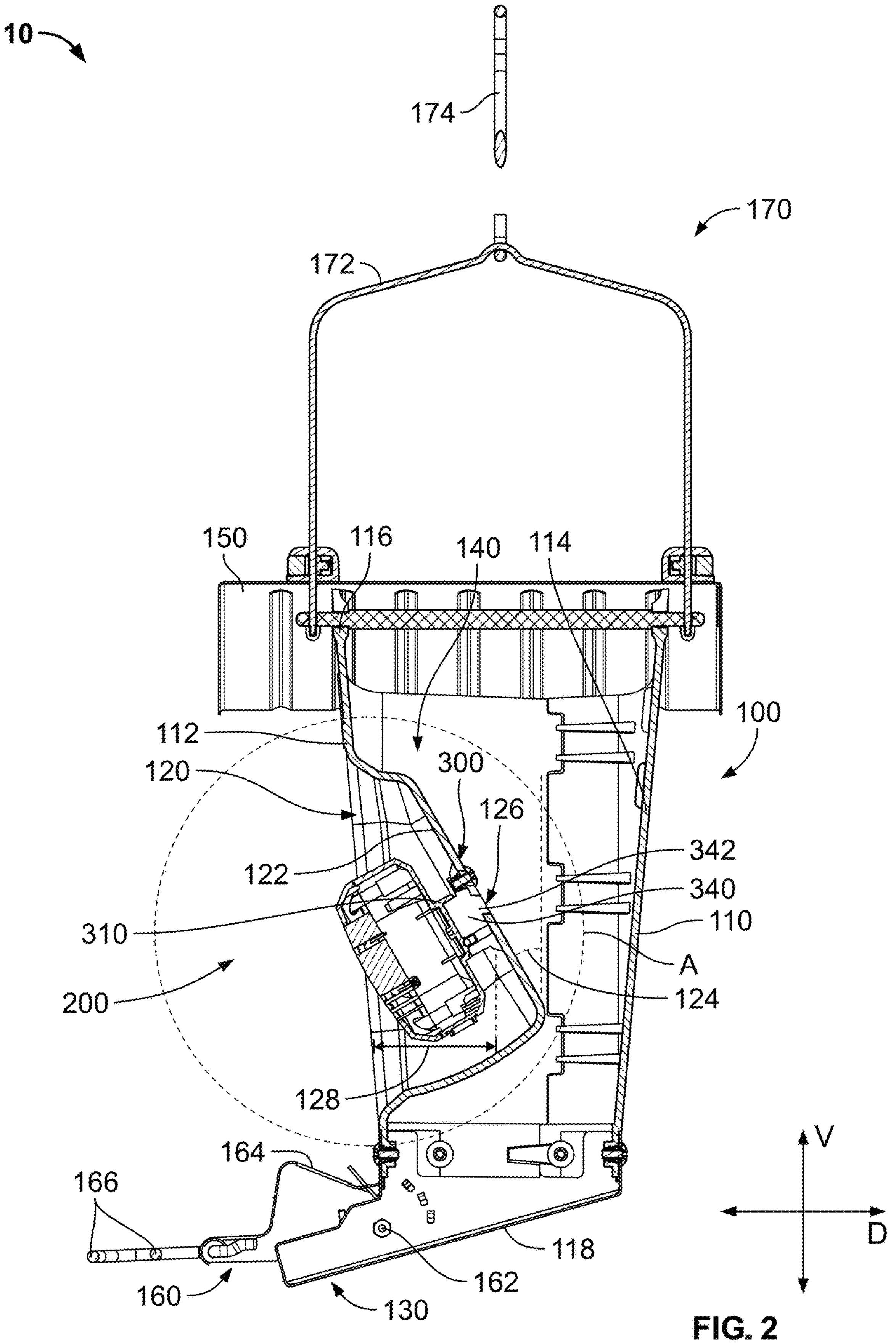
FIG. 2 is a sectional side view of the feeder assembly of FIG. 1.

A feeder assembly 10 according to an embodiment is shown in FIGS. 1 and 2. The feeder assembly 10 includes a bird feeder 100, a camera module 200, and a camera mount 300 releasably fixing the camera module 200 in the bird feeder 100.

The bird feeder 100, as shown in FIGS. 1 and 2, has a housing 110. The housing 110 has an outer surface 112 and an inner surface 114 opposite the outer surface 112 in the horizontal direction H, and extends from an upper end 116 to a bottom 118 in the vertical direction V. In the embodiment shown in FIG. 2, the housing 110 tapers from the upper end 116 to the bottom 118 in the vertical direction V. The housing 110 defines a feed container 140 in which feed for birds, for example various types of seeds or seed mixtures, can be filled.

As shown in FIGS. 1 and 2, the housing 110 has a camera recess 120 extending into the outer surface 112 in the depth direction D. The housing 110 has a mount surface 122 forming a portion of the outer surface 112 positioned in and facing the camera recess 120. The mount surface 122 is positioned at a mount angle 124 with respect to the vertical direction V; the mount angle 124 is an acute angle with respect to the vertical direction V. In an embodiment, the mount angle 124 is approximately 30-45°. In other embodiments, the mount angle 124 could be any fixed angle greater than 0° and less than 90°.

As shown in FIG. 2, a mount opening 126 extends through the mount surface 122 from the outer surface 112 through to the inner surface 114 of the housing 110. The mount opening 126, in the shown embodiment, is positioned approximately centrally in the mount surface 122 and has a shape corresponding to a shape of portion of the camera mount 300 described in greater detail below.

In the embodiment shown in FIGS. 1 and 2, the housing 110 has a protruding section 130 extending from the bottom 118. The protruding section 130, as shown in FIG. 1, has a plurality of feed ports 132 extending through the housing 110 and communicating between an exterior of the housing 110 and the feed container 140.

In an embodiment, the housing 110, including the upper end 116, the bottom 118, the camera recess 120, and the protruding section 130, can be formed from multiple materials and/or in multiple parts, and is connected together to form the feed container 140. In another embodiment, the housing 110 can be monolithically formed in a single piece.

The bird feeder 100, in the embodiment shown in FIGS. 1 and 2, has a perch assembly 160 positioned around the protruding section 130. The perch assembly 160 is attached to the housing 110 by a spring hinge 162 and is rotatable about the spring hinge 162 with respect to the housing 110. The perch assembly 160 has a port cover 164 and a plurality of bars 166 fixed to the port cover 164 and extending in the lateral direction L. The bars 166 are sized for birds to land or perch upon. In other embodiments, the perch assembly 160 can be omitted or the bars 166 can be fixed, i.e. non-rotatable, with respect to the housing 110.

As shown in FIGS. 1 and 2, the bird feeder 100 includes a roof 150 positioned over the upper end 116 of the housing 110 and enclosing the feed container 140. The roof 150 can be formed of any material used in bird feeders and has a shape corresponding to the shape of the upper end 116 of the housing 110. In the shown embodiment, the roof 150 is positioned on a plurality of attachment elements 170 of the bird feeder 100 that allow the roof 150 to be moved with respect to the upper end 116 of the housing 110 or secured in place on the upper end 116 of the housing 110.

The attachment elements 170 are also used to attach and, in an embodiment, suspend the feeder assembly 10 from an outdoor object, such as a post or a tree, to make the feeder assembly 10 accessible by birds. In the embodiment shown in FIGS. 1 and 2, the attachment elements 170 include a bracket 172 on which the roof 150 is disposed and an S-hook 174 connected to the bracket 172. The bracket 172 is fixed to the upper end 116 of the housing 110 and the roof 150 is slidable along the bracket 172. The S-hook 174 allows the bracket 172 and connected feeder assembly 10 to be hung from exterior objects. In other embodiments, the attachment elements 170 can be different than the bracket 172 and the S-hook 174 shown, and can be any type of attachment elements that can be used to attach a housing of a bird feeder to an external object.

Figure 3:
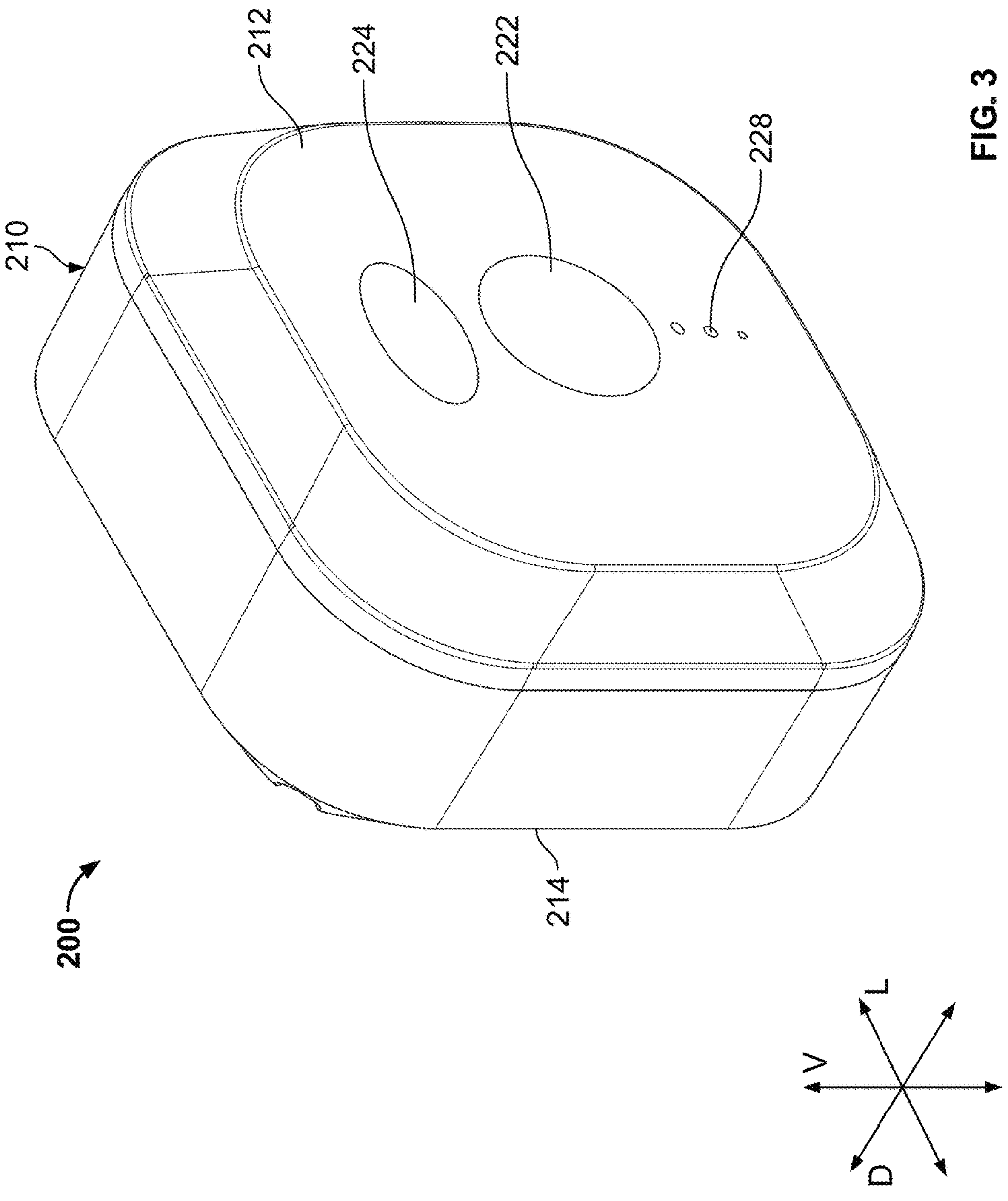
FIG. 3 is a front perspective view of a camera module.
Figure 4:
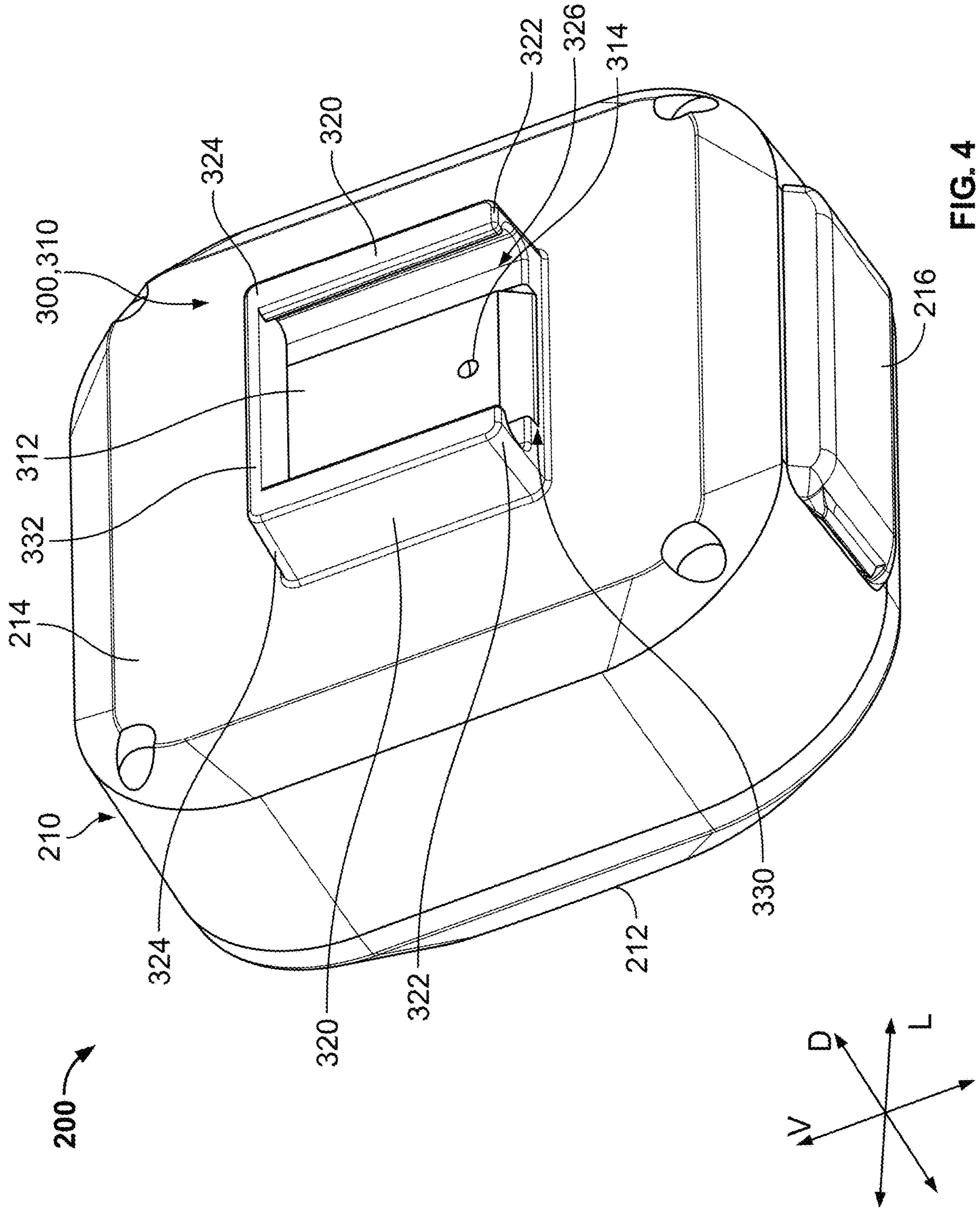
FIG. 4 is a rear perspective view of the camera module of FIG. 3.

The camera module 200, as shown in FIGS. 3 and 4, includes a body 210 and a plurality of camera electronics 220 positioned within the body 210. The body 210 has a front side 212 and a back side 214 opposite the front side 212 in the depth direction D. The body 210 has a charging port 216 on a surface facing in the vertical direction V. In an embodiment, the body 210 is formed in multiple pieces from a plastic material and is attached together to contain the camera electronics 220.

Figure 12:
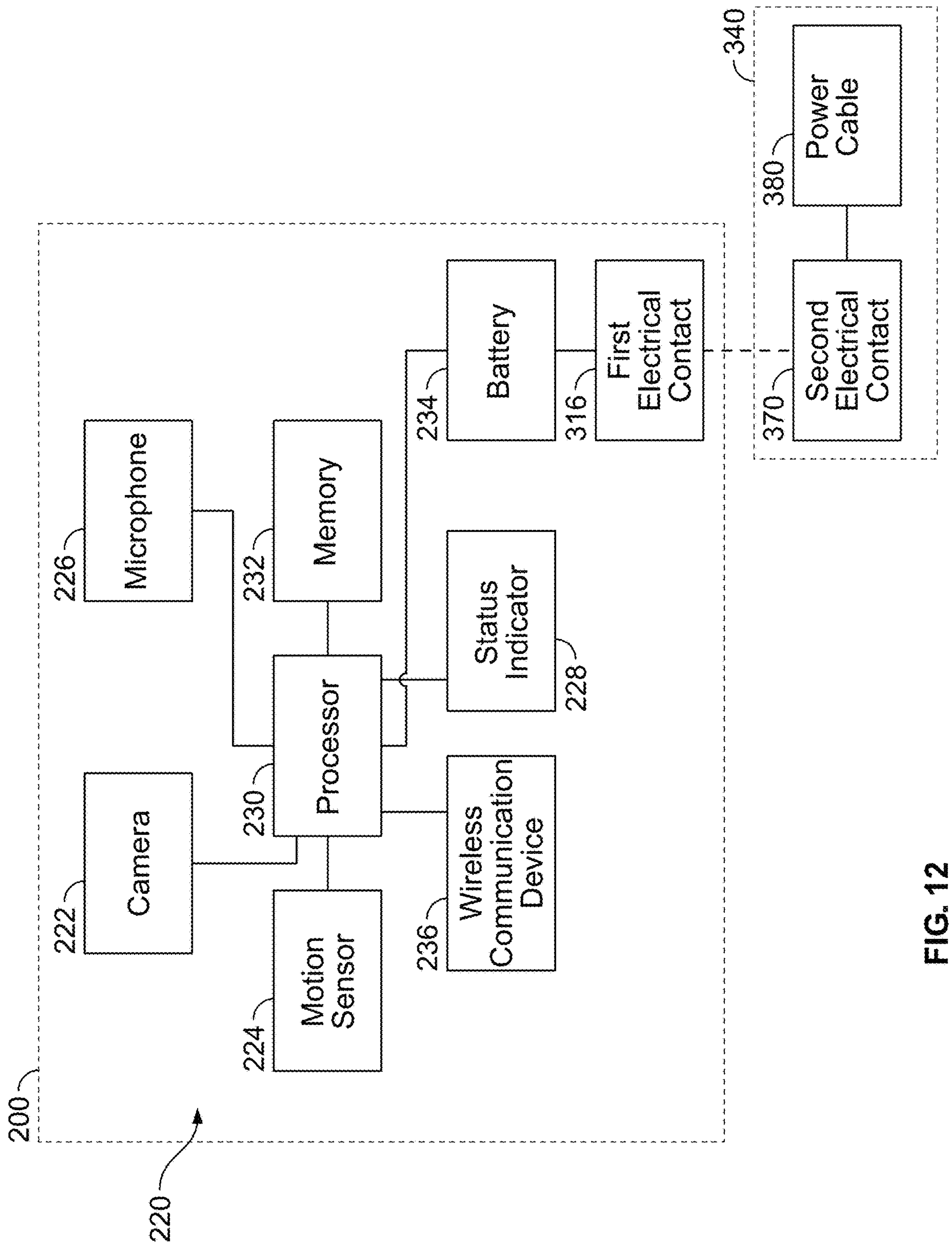
FIG. 12 is a block diagram of the camera module and the dock.

The camera electronics 220 positioned with the body 210 are shown in a block diagram in FIG. 12. Some of the camera electronics 220, as described herein and shown in FIG. 3, are exposed through the body 210. The camera electronics 220 include a camera 222, a motion sensor 224, and a status indicator 228 that are exposed on the front side 212.

In an embodiment, the camera 222 is a high-definition camera, such as a 1080p resolution camera, and has a field of view of approximately 110°. In other embodiments, the camera 222 may be any type of digital camera that can fit within the camera module 200 and perform the functions of the camera 222 described herein. The motion sensor 224, in an embodiment, is an infrared sensor, such as a passive infrared (PIR) sensor. In other embodiments, the motion sensor 224 may be any type of motion sensor that is capable of detecting the motion or presence of birds in a proximity of the camera module 200. The status indicator 228, in an embodiment, is an LED that, as described below, can indicate a status of the camera module 200. In other embodiments, the status indicator 228 may be any type of device that can be used to indicate an on or off state of the camera module 200.

As shown in FIG. 12, the camera electronics 220 positioned within the body 210 further include a microphone 226. The microphone 226 may be any type of audio capture device that is positionable in the camera module 200 and can detect bird calls and other sounds related to birds in the proximity of the camera module 200. The body 210 of the camera module 200 may have an opening adjacent to the microphone 226 to permit the audio to more efficiently reach the microphone 226.

The camera electronics 220, as shown in FIG. 12, further include a processor 230 and a memory 232 connected to the processor 230. The memory 232 is a non-transitory computer readable medium storing a plurality of program instructions that, when executed by the processor 230, perform the functions of the camera module 200 described herein. The processor 230 is connected to the camera 222, the motion sensor 224, the microphone 226, and the status indicator 228.

As shown in FIG. 12, the camera module 200 further includes a battery 234 and a wireless communication device 236 connected to the processor 230. The battery 234 provides power to the processor 230. In an embodiment, the battery 234 is a rechargeable battery, such as a 4000 mAh lithium-ion battery. In other embodiments, the battery 234 may be any other type of rechargeable battery, or may be a consumable, replaceable battery. The wireless communication device 236 may be any device capable of transmitting data, such as images and audio, wirelessly, such as through a Wi-fi network and/or via any type of near-field communication (NFC).

Figure 5:
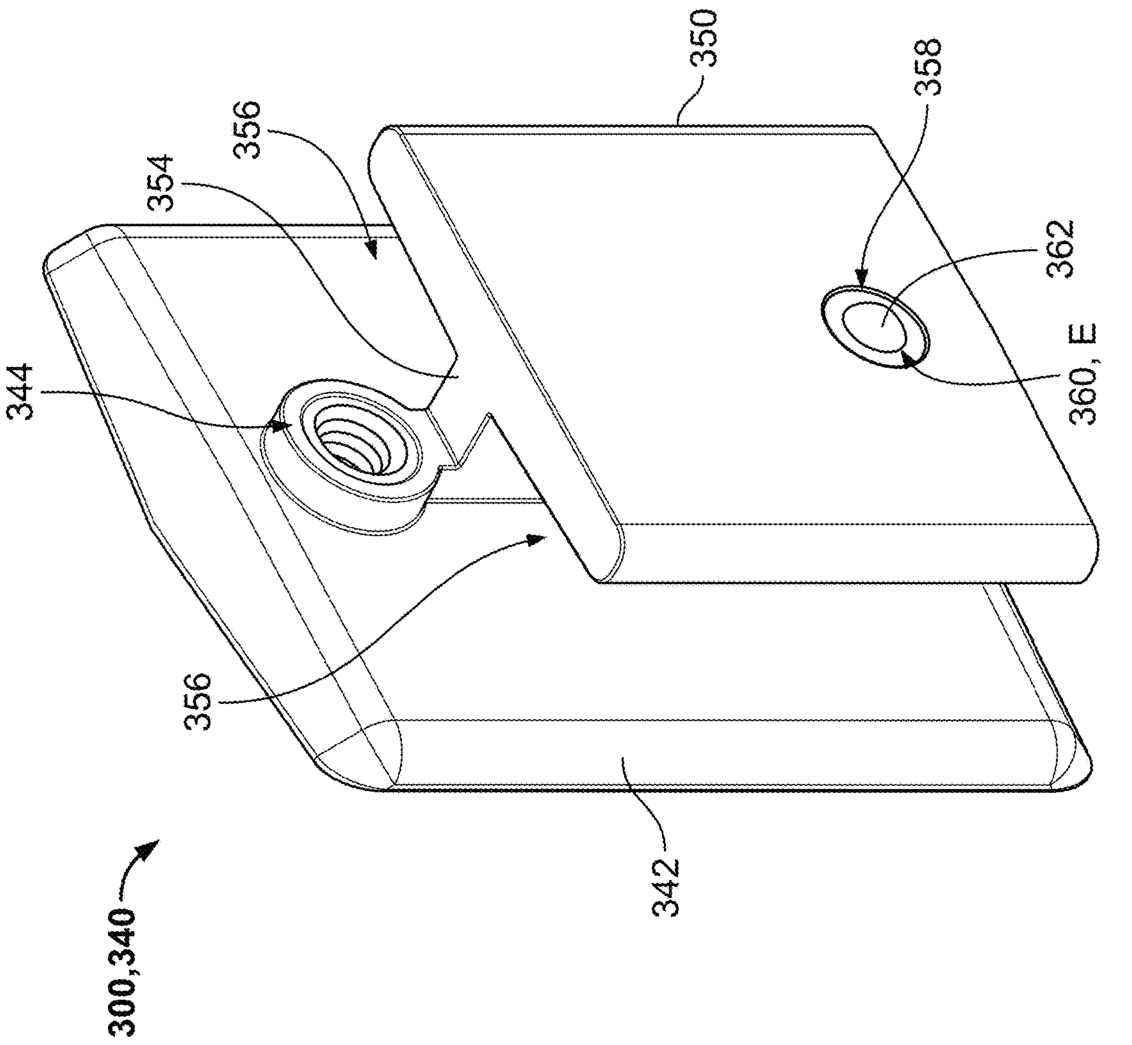
FIG. 5 is a perspective view of a dock of a camera mount.

The camera mount 300, shown in FIGS. 2, 4, and 5, includes a cleat 310 fixed to the camera module 200 and a dock 340 fixed to the bird feeder 100.

The cleat 310, as shown in detail in FIG. 4, has a base 312 and a pair of arms 320 extending from the base 312. The base 312 has a recess 314 positioned approximately centrally on the base 312 between the arms 320 in the lateral direction L. The recess 314, in an embodiment, is a semicircular indent extending into the base 312 that is shaped, for example, to receive half of a ball.

The arms 320 each extend from a first end 322 to an opposite second end 324 along the vertical direction V. The cleat 310 has an open end 330 at the first ends 322 of the arms 320 and an end stop 332 connecting the second ends 324 of the arms 320. The end stop 332 extends in the lateral direction L. In the depth direction D protruding from the base 312, the arms 320 are shaped to form a dock passageway 326 between them. In the embodiment shown in FIG. 4, the arms 320 have an approximately circular shape in the depth direction D to form the dock passageway 326. In other embodiments, the arms 320 could have any other shape that forms the widened dock passageway 326 extending along the vertical direction V and constrained by the arms 320 in the depth direction D and the lateral direction L.

The cleat 310, as shown in FIG. 4, is fixed on the back side 214 of the body 210 of the camera module 200. In an embodiment, the cleat 310 may be attached to the back side 214, for example by adhesive or by fasteners. In another embodiment, the cleat 310 can be monolithically formed in a single piece with the back side 214 of the body 210.

The dock 340 of the camera mount 300 is shown in detail in FIG. 5. The dock 340 includes a first plate 342, a second plate 350 approximately parallel to the first plate 342, and a web 354 connecting the first plate 342 and the second plate 350.

Figure 7:
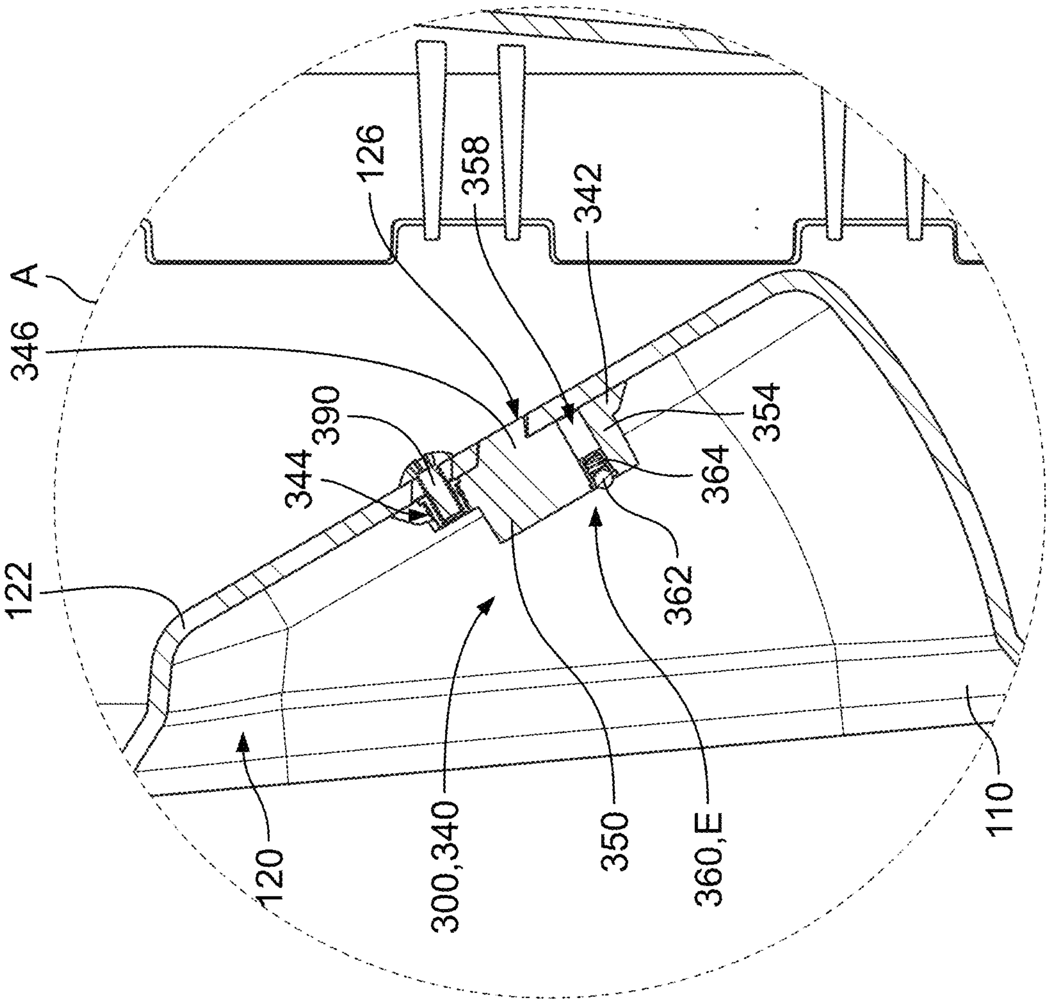
FIG. 7 is a sectional side view of a portion A of FIG. 2 without the camera module.

The first plate 342, as shown in FIG. 5, has a fastening passageway 344 extending through the first plate 342. In the shown embodiment, the fastening passageway 344 is positioned adjacent to an end of the web 354. The first plate 342, as shown in FIGS. 2 and 7, has a protrusion 346 extending away from a side of the first plate 342 opposite the second plate 350. The protrusion 346, in the shown embodiment, extends at an angle with respect to the first plate 342.

The web 354, as shown in FIG. 5, extends perpendicularly to the first plate 342 and the second plate 350 and is positioned approximately centrally on the first plate 342 and the second plate 350. The web 354 creates a receiving space 356 formed around the web 354 between the first plate 342 and the second plate 350.

As shown in FIGS. 5 and 7, the dock 340 has a detent passageway 358 extending through the first plate 342, the second plate 350, and the web 354. The dock 340 has a detent mechanism 360 positioned in the detent passageway 358. The detent mechanism 360 includes a detent ball 362 and a spring 364 abutting the detent ball 362. An end of an opening of the detent passageway 358 at the second plate 350 is sized to retain the detent ball 362 in the detent passageway 358. The spring 364 biases the detent ball 362 into an extended position E, shown in FIGS. 5 and 7, in which a portion of the detent ball 362 protrudes out of the detent passageway 358 and beyond the second plate 350. A force applied on the exposed portion of the detent ball 362 can push the detent ball 362 out of the extended position E and back into the detent passageway 358 against the force of the spring 364, compressing the spring 364 in the detent passageway 358.

Figure 6:
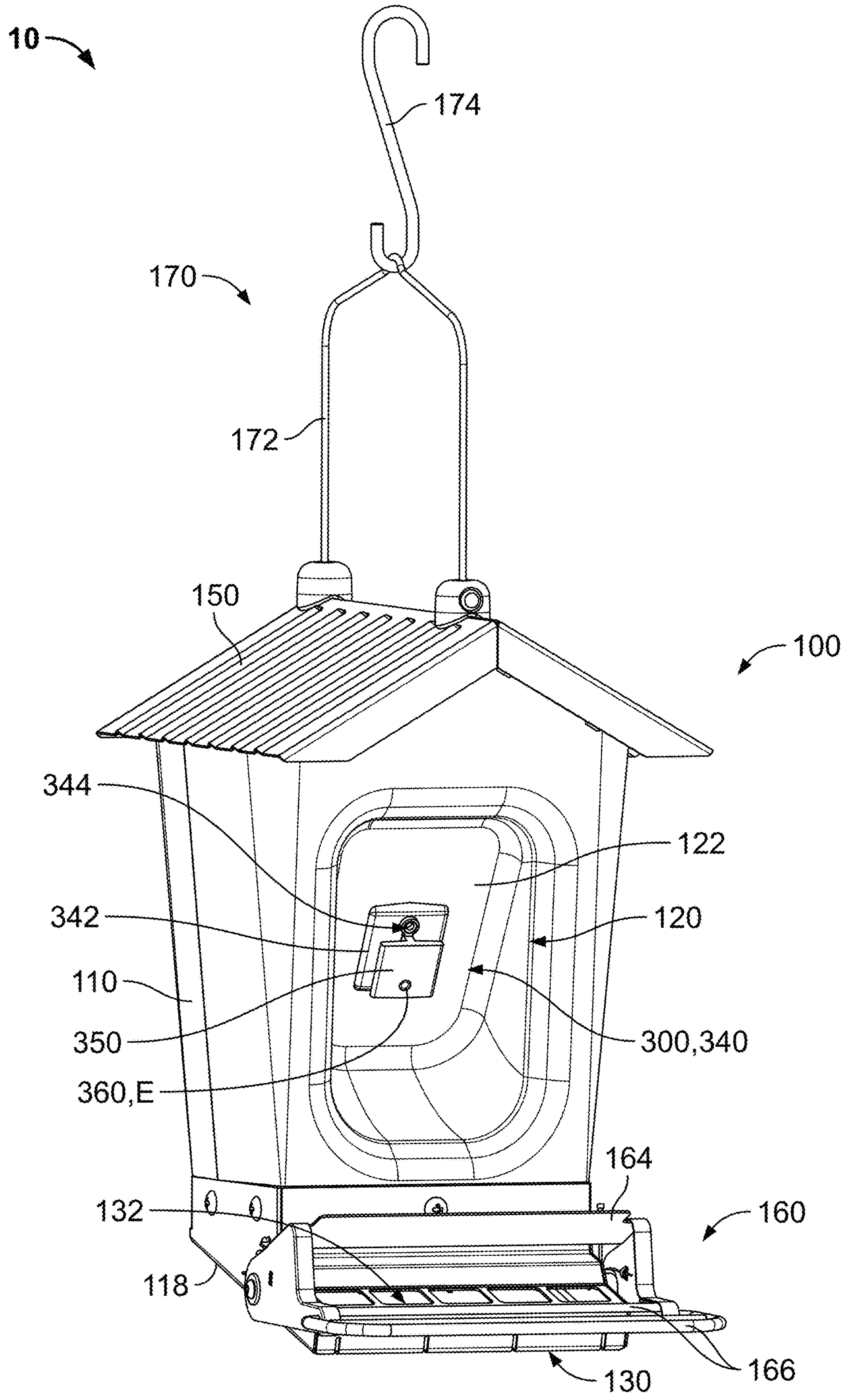
FIG. 6 is a perspective view of the feeder assembly of FIG. 1 without the camera module.

The dock 340, separate from the cleat 310, is fixed to the bird feeder 100 as shown in FIGS. 6 and 7. The dock 340 is positioned in the camera recess 120 of the housing 110 against the mount surface 122. As shown in FIG. 7, the protrusion 346 of the first plate 342 is positioned in the mount opening 126 in the mount surface 122 to temporarily hold the dock 340 in position against the mount surface 122. A fastener 390 is then positioned in the fastening passageway 344 and through the mount surface 122 to fix the dock 340 to the mount surface 122.

When the dock 340 is mounted to the bird feeder 100, as shown in FIGS. 6 and 7, the dock 340 has a fixed position in which the first plate 342 and the second plate 350 extend parallel to the mount angle 124 of the mount surface 122, shown in FIG. 2. The dock 340 is fixed approximately centrally on the mount surface 122.

A mounting of the camera module 200 in the bird feeder 100 using the camera mount 300 will now be described in greater detail primarily with reference to FIGS. 6-9.

Figure 8:
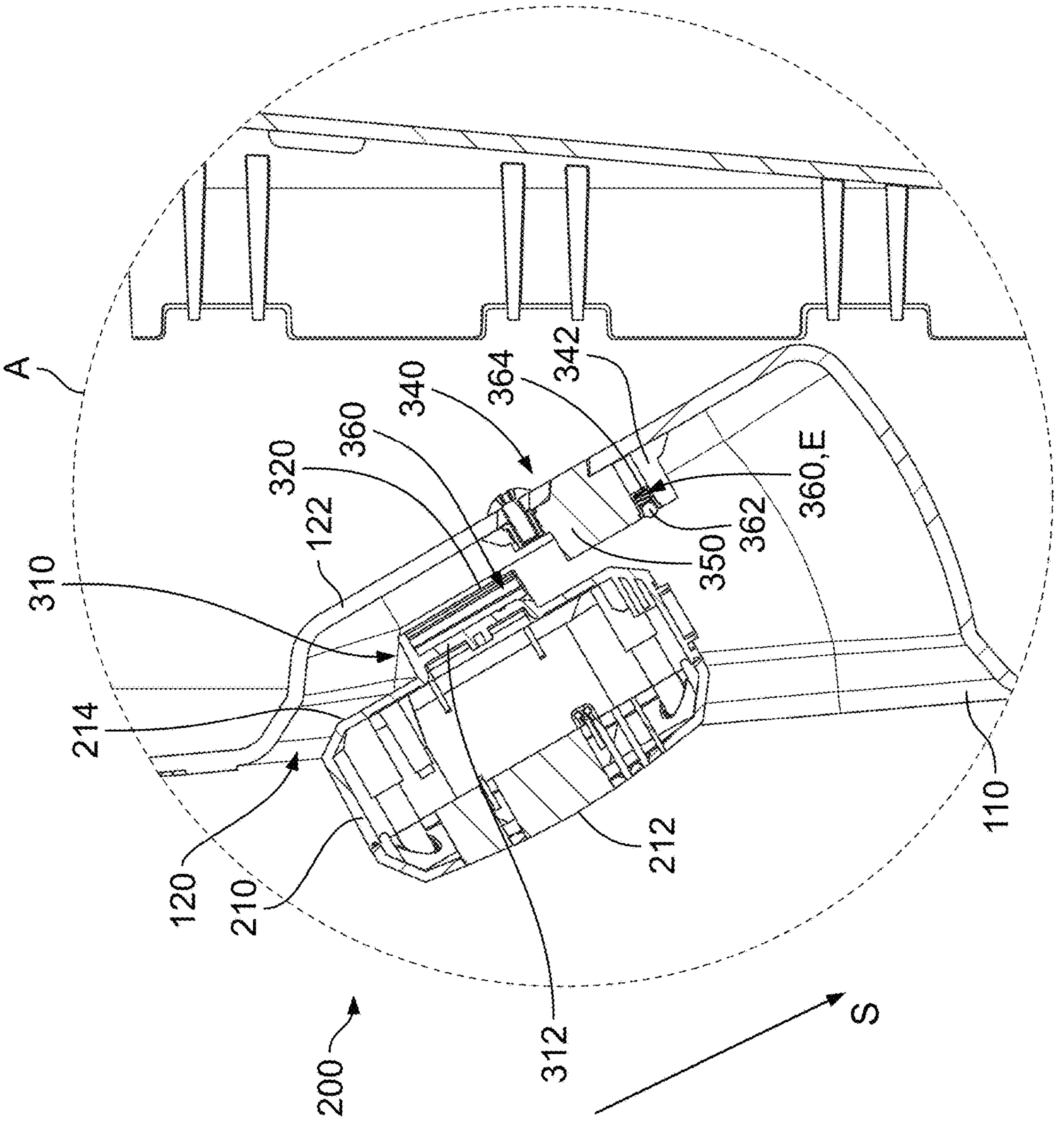
FIG. 8 is a sectional side view of the portion A of FIG. 2 during insertion of the camera module.

With the dock 340 fixed to the bird feeder 100 within the camera recess 120 as shown in FIGS. 6 and 7, the camera module 200 is positioned within the camera recess 120 above the dock 340, as shown in FIG. 8. The open end 330 of the cleat 310 is positioned to face the dock 340. In a separated position of the cleat 310 and the dock 340 shown in FIG. 8, the detent mechanism 360 is in the extended position E.

Figure 9:
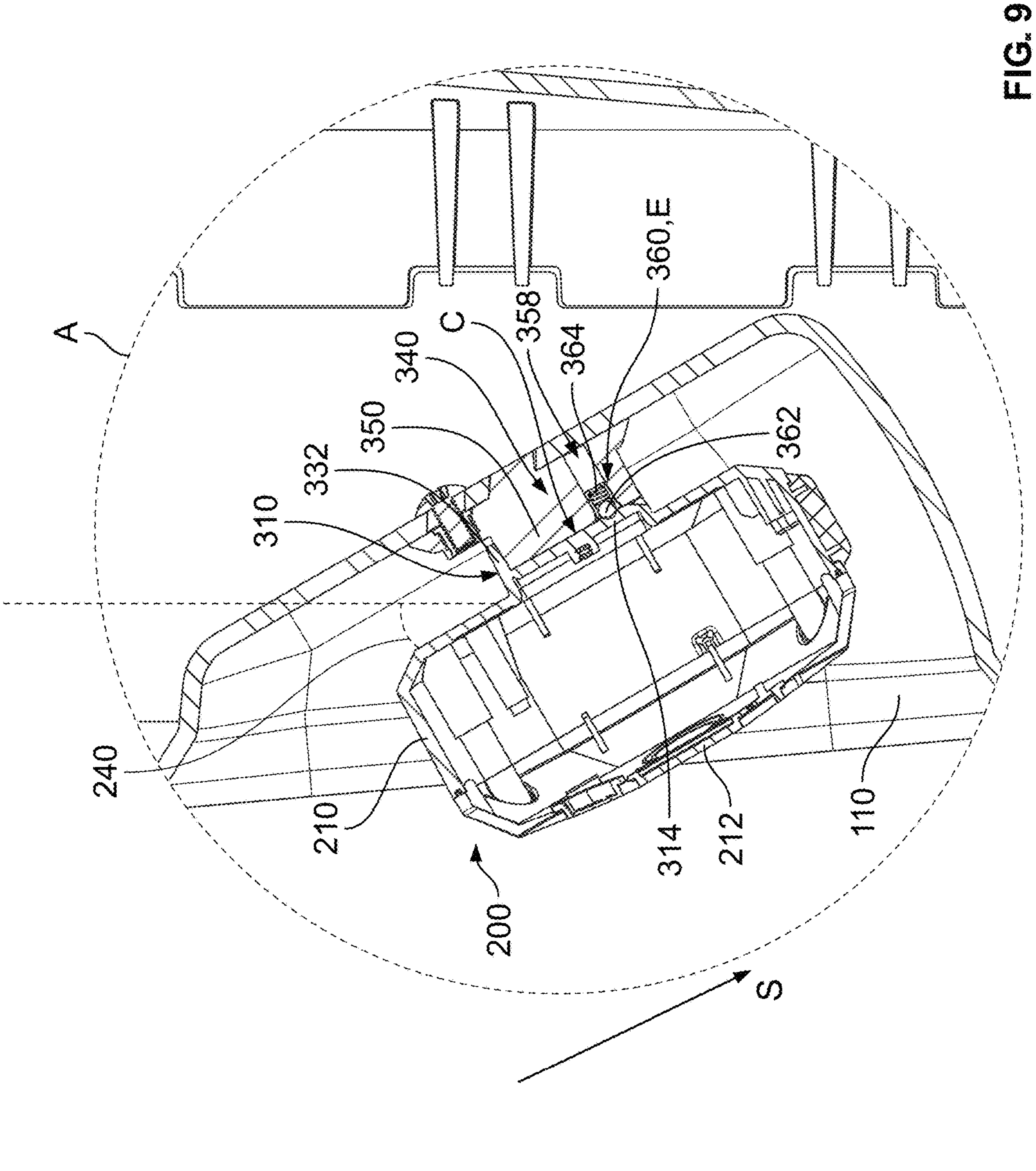
FIG. 9 is a sectional side view of the portion A of FIG. 2 with the camera module in a connected position.

The cleat 310 is then slid onto the dock 340 in a sliding direction S from the position shown in FIG. 8 to a connected position C shown in FIG. 9. As the cleat 310 is slid onto the dock 340 in the sliding direction S, the dock 340 enters the open end 330 of the cleat 310. The arms 320 of the cleat 310 are received in the receiving space 356 around the web 354 between the first plate 342 and the second plate 350. The second plate 350 is received in the dock passageway 326 defined by the arms 320; the dock passageway 326 has a shape corresponding to a shape of the second plate 350. The arms 320 slide along the dock 340 as the camera module 200 moves in the sliding direction S, with the second plate 350 moving along the dock passageway 326.

During sliding of the cleat 310 onto the dock 340 in the sliding direction S, the base 312 of the cleat 310 reaches a position in which the base 312 contacts the detent ball 362 in the extended position E of the detent mechanism 360. As the cleat 310 is further slid in the sliding direction S, the base 312 depresses the detent ball 362 and pushes the detent ball 362 back into the detent passageway 358 against the bias of the spring 364.

The detent ball 362 remains depressed in the detent passageway 358 until the cleat 310 reaches the connected position C shown in FIG. 9, in which the end stop 332 of the cleat 310 abuts against the second plate 350 and prevents further movement of the cleat 310 in the sliding direction S. In the connected position C, the recess 314 of the base 312 is aligned with the detent passageway 358 and the detent ball 362, under the biasing force of the spring 364, returns to the extended position E. The detent ball 362 engages the recess 314 in the connected position C, securing and fixing the cleat 310 and the camera module 200 to the dock 340. The engagement of the detent ball 362 in the recess 314 provides a haptic and auditory indication that the cleat 310 and the camera module 200 have reached the connected position C.

In the connected position C shown in FIG. 9, the arms 320 are positioned around the second plate 350, constraining movement of the cleat 310 with respect to the dock 340 in the depth direction D and in the lateral direction L. The end stop 332, as described above, prevents further movement of the cleat 310 with respect to the dock 340 along the sliding direction S. The engagement of the detent ball 362 resists movement of the cleat 310 with respect to the dock 340 to fix the cleat 310 to the dock 340 but, if sufficient force is applied, the cleat 310 and the camera module 200 are moveable from the fixed connected position C by sliding in a direction opposite to the sliding direction S. During removal, the detent mechanism 358 is depressed from the extended position E by the base 312, permitting the cleat 310 and the camera module 200 fixed to the cleat 310 to be removed from the dock 340 counter to the sliding direction S. The cleat 310 is only removable from the dock 340 by sliding the cleat 310 in the direction opposite to the sliding direction S.

The detent mechanism 360 thus releasably fixes the cleat 310 and the camera module 200 to the dock 340 and the bird feeder 100 without requiring the use of any tools or additional hardware. In the embodiment shown in FIGS. 6-9, to reach the connected position C, the sliding direction S of the cleat 310 onto the dock 340 is a linear direction that is at the mount angle 124 with respect to the vertical direction V. In other embodiments, the sliding direction S to reach the connected position C can be a linear direction that is in the lateral direction L, or can be a rotation of the cleat 310 with respect to the dock 340, such as in a bayonet mount. In another embodiment, the dock 340 may have an additional spring that ejects the cleat 310 if the cleat 310 has not fully reached the connected position C.

Figure 10:
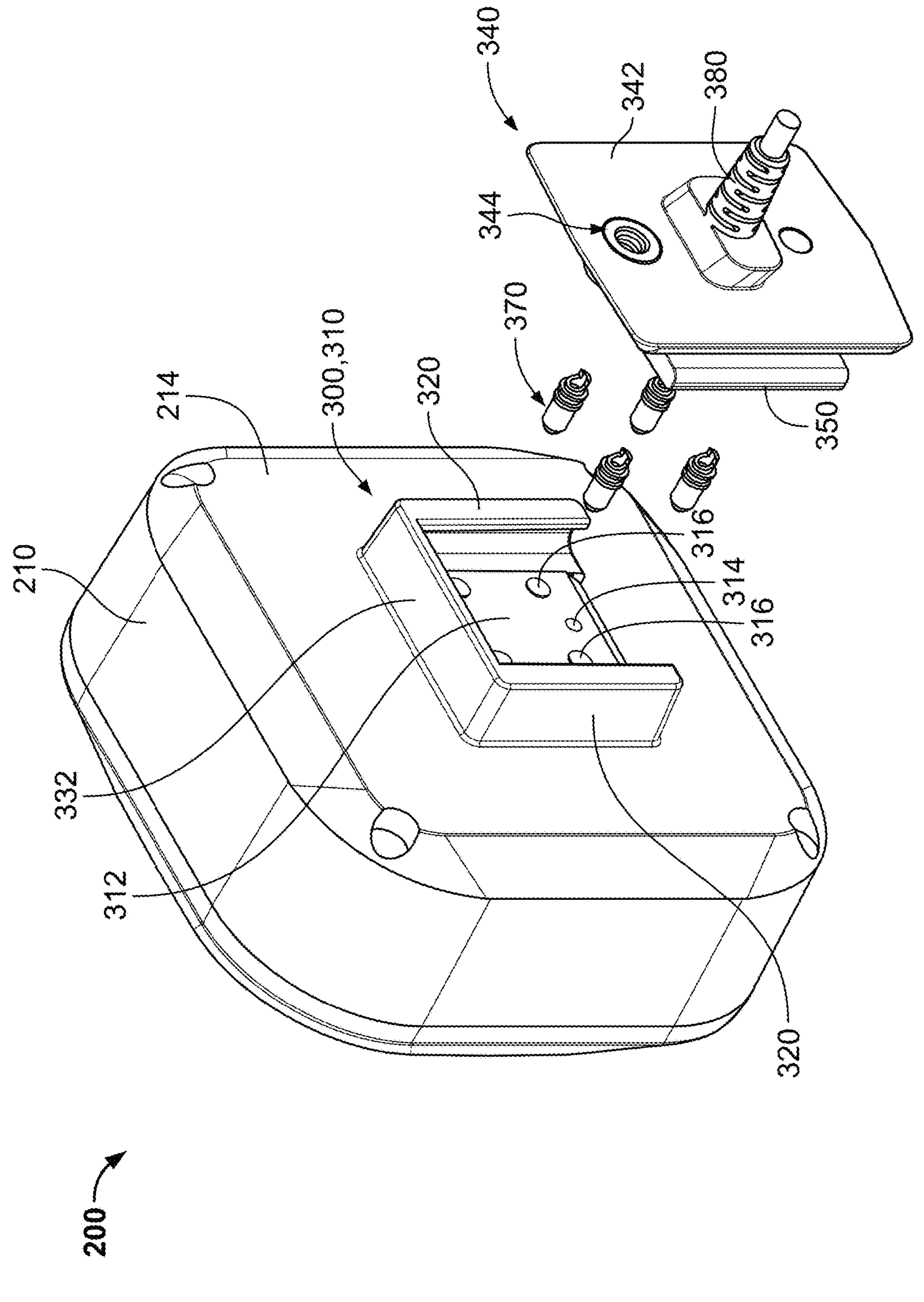
FIG. 10 is an exploded perspective view of a camera module and camera mount according to another embodiment.
Figure 11:
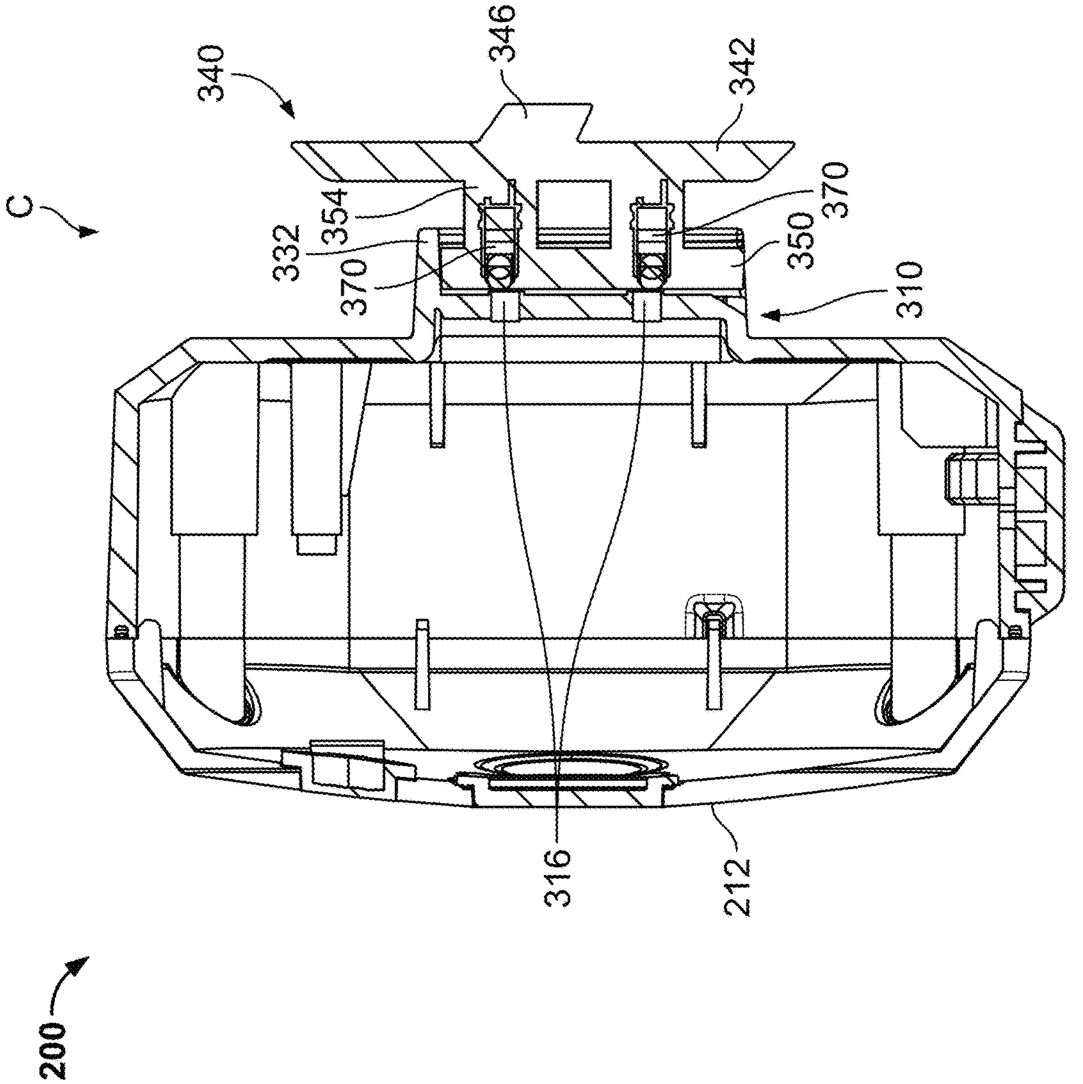
FIG. 11 is a sectional side view of the camera module and camera mount of FIG. 10 in a connected position.

In an embodiment shown in FIGS. 10 and 11, the camera mount 300 can also form an electrical connection between the camera module 200 and the bird feeder 100.

As shown in FIG. 10, the cleat 310 has a plurality of first electrical contacts 316 positioned on the base 312. The first electrical contacts 316 are contact pads formed of any type of conductive material used for electrical connection. As shown in FIG. 12, the first electrical contacts 316 are connected to the battery 234 of the camera module 200.

The dock 340, as shown in FIGS. 10 and 11, has a plurality of second electrical contacts 370 that are positioned to extend through the dock 340 and protrude from the second plate 350. In an embodiment, the second electrical contacts 370 may be spring-loaded pogo contacts. In another embodiment, the second electrical contacts 370 could be leaf springs, or any other type of terminal used for electrically connecting with a contact pad.

As shown in FIGS. 10 and 12, the second electrical contacts 370 are electrically connected with a power cable 380 that, for example, can extend through the bird feeder 100. The power cable 380 may be connected to a power source, such as a solar panel positioned on the bird feeder 100, a battery positioned within the bird feeder 100, a mains electrical supply, or any other type of power source. In this embodiment, the second electrical contacts 370 each mate with one of the first electrical contacts 316 when the cleat 310 and the dock 340 reach the connected position C described above, as shown in FIG. 11.

A function and usage of the feeder assembly 10 will now be described in greater detail, primarily with respect to FIGS. 1, 2, and 12.

A user releasably mounts the camera module 200 to the bird feeder 100 with the camera mount 300, as described above, to position the camera module 200 in the camera recess 120 of the bird feeder 100 as shown in FIG. 1. A user fills the feed container 140, either before or after mounting the camera module 200, with feed for birds, such as various types of seed. The feed, under gravity, follows the sloped bottom 118 of the bousing 110 and collects in the protruding section 130 shown in FIG. 2, wherein the feed is exposed to the exterior through the feed ports 132 of the housing 110. The feeder assembly 10 is suspended or otherwise secured by the attachment elements 170 in an outdoor environment in which birds can access the feeder assembly 10.

In the embodiment of the feeder assembly 10 shown in FIGS. 1 and 2, if an animal heavier than a bird, such as a squirrel, lands on the bars 166 in an attempt to access the feed through the feed ports 132, the weight of the animal pivots the perch assembly 160. The perch assembly 160 rotates under the excess weight to a closed position in which the port cover 164 covers and prevents access to the feed ports 132. The perch assembly 160 thus prevents or at least limits access to the feed for animals heavier than birds. When the heavier animal leaves the bars 166, the perch assembly 160 returns, by the spring hinge 142, to the position shown in FIG. 1. The perch assembly 160 is merely an exemplary embodiment and, as described above, in other embodiments the bars 166 could be fixed in proximity to the feed ports 132 without a pivoting element, or the bird feeder 100 could have other arrangements of the housing 110 that permit birds to access contained feed.

A bird lands on one of the bars 166 of the perch assembly 160 to access the feed in the feed ports 132. The perch assembly 160 remains in the position shown in FIG. 1 under the weight of the bird. The perch assembly 160 and the feed port 132 are in view of the camera module 200 in the connected position C.

When the bird lands in a detection area of the motion sensor 224, the motion sensor 224 sends a signal to the processor 230, which controls the camera 222 to record an image or video of the bird at the bird feeder 100. The processor 230, in an embodiment, also controls the microphone 226 to record audio of the bird at the feeder 100. The processor 230, in various embodiments, can store the image, video, and/or audio of the bird in the memory 232, and/or can transmit the image, video, and/or audio to a user's computing device using the wireless communication device 236.

When the camera module 200 is on and able to capture images, video, and/or audio of birds, the processor 230 may also illuminate the status indicator 228 to provide an external indication of the on or off status to the user. During use, the battery 234 supplies power to the processor 230 and the other camera electronics 220 to perform the functions of the camera module 200 described herein. In the embodiment including the electrical contacts 316, 370, in the connected position C, the first electrical contacts 316 are connected with the second electrical contacts 370 and the power supply along the power cable 380 can be used to charge the battery 234, providing for longer functionality of the camera module 200 between charges. The camera mount 300 in the connected position C provides for proper alignment and mating of the electrical contacts 316, 370.

With the camera module 200 mounted to the bird feeder 100 by the camera mount 300 in the connected position C as described above, the camera module 200 is fixedly, rigidly, and releasably connected to the bird feeder 100 by the detent mechanism 360. The camera mount 300 secures the camera module 200 at a fixed orientation in the connected position C. The camera module 200 is positioned at an acute camera angle 240 with respect to the vertical direction V, as shown in FIG. 9, in the fixed orientation of the connected position C. The acute angle 240 is selected, by creating the mount angle 124 of the camera recess 120 in the shown embodiment, to provide the correct viewing angle for images of the bird at the bird feeder 100. The field of view of the camera 222, in combination with the fixed camera angle 240, provides the user with the optimal orientation and alignment for images of the bird whenever the camera module 200 is in the connected position C, avoiding the possibility of user error or of birds appearing out of frame. In an embodiment, the camera angle 240 created by the mount angle 124 is approximately 30-45°. In other embodiments, the camera angle 240 could be any fixed angle greater than 0° and less than 90°.

With the camera module 200 mounted within the bird feeder 100 by the camera mount 300 in the connected position C, the camera module 200 is positioned in the camera recess 120 at a mount depth 128 shown in FIG. 2. The mount depth 128 ensures that the camera module 200 is covered by the housing 110 on all sides except the front side 212 of the camera module 200, as shown in FIG. 1. The camera recess 120 protects the camera module 200 from weather or other contaminates that could enter the body 210, and potentially cause the camera electronics 220 to malfunction, or otherwise disrupt the connection between the electrical contacts 316, 370.

As described above, the camera module 200 is removable from the bird feeder 100 only by sliding the cleat 310 in a direction opposite the sliding direction S. The releasable fixing and removal of the camera module 200 via the camera mount 300 allows for simple and reliable installation and removal without the use of tools or other additional equipment.

The bird feeder 100 according to the embodiment shown in FIGS. 1 and 2 is merely one example of a bird feeder 100 that can be used with the camera module 200 and camera mount 300 according to the present disclosure. The camera mount 300 can be universal across different types of bird feeders 100, allowing the same camera module 200 to be connected to and used interchangeably with different feeders 100.

Figure 13:
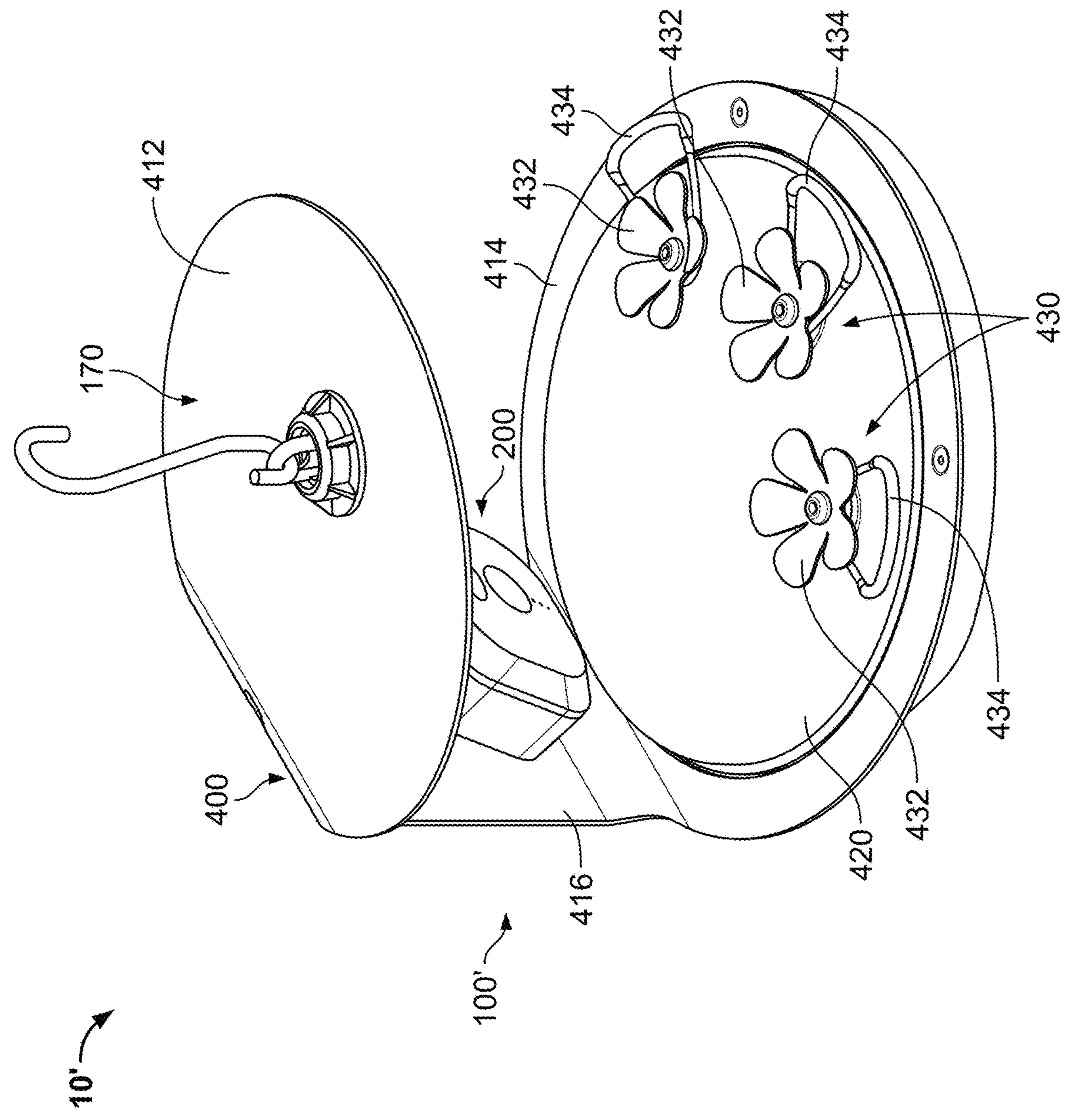
FIG. 13 is a perspective view of a feeder assembly according to another embodiment.
Figure 14:
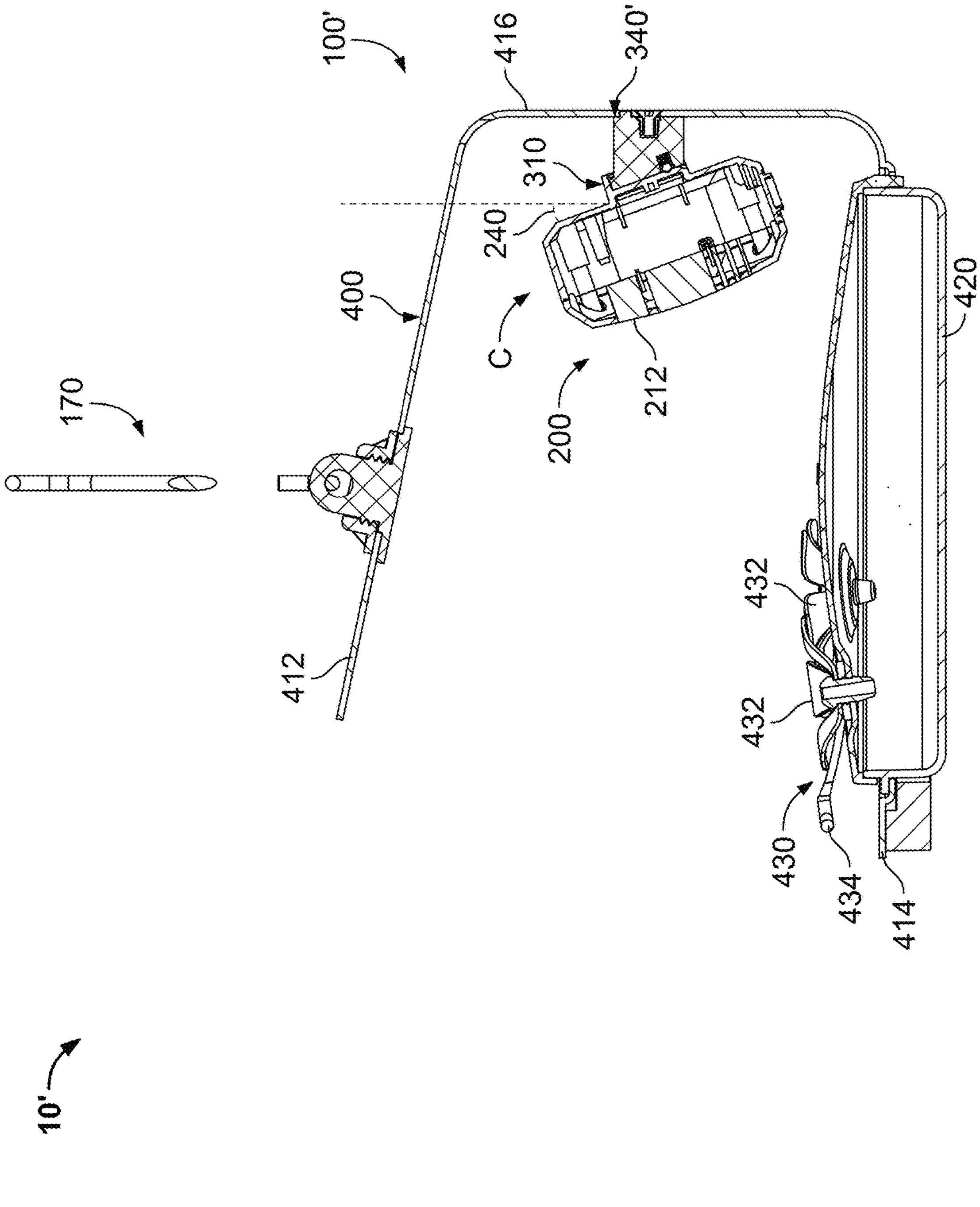
FIG. 14 is a sectional side view of the feeder assembly of FIG. 13.
Figure 15:
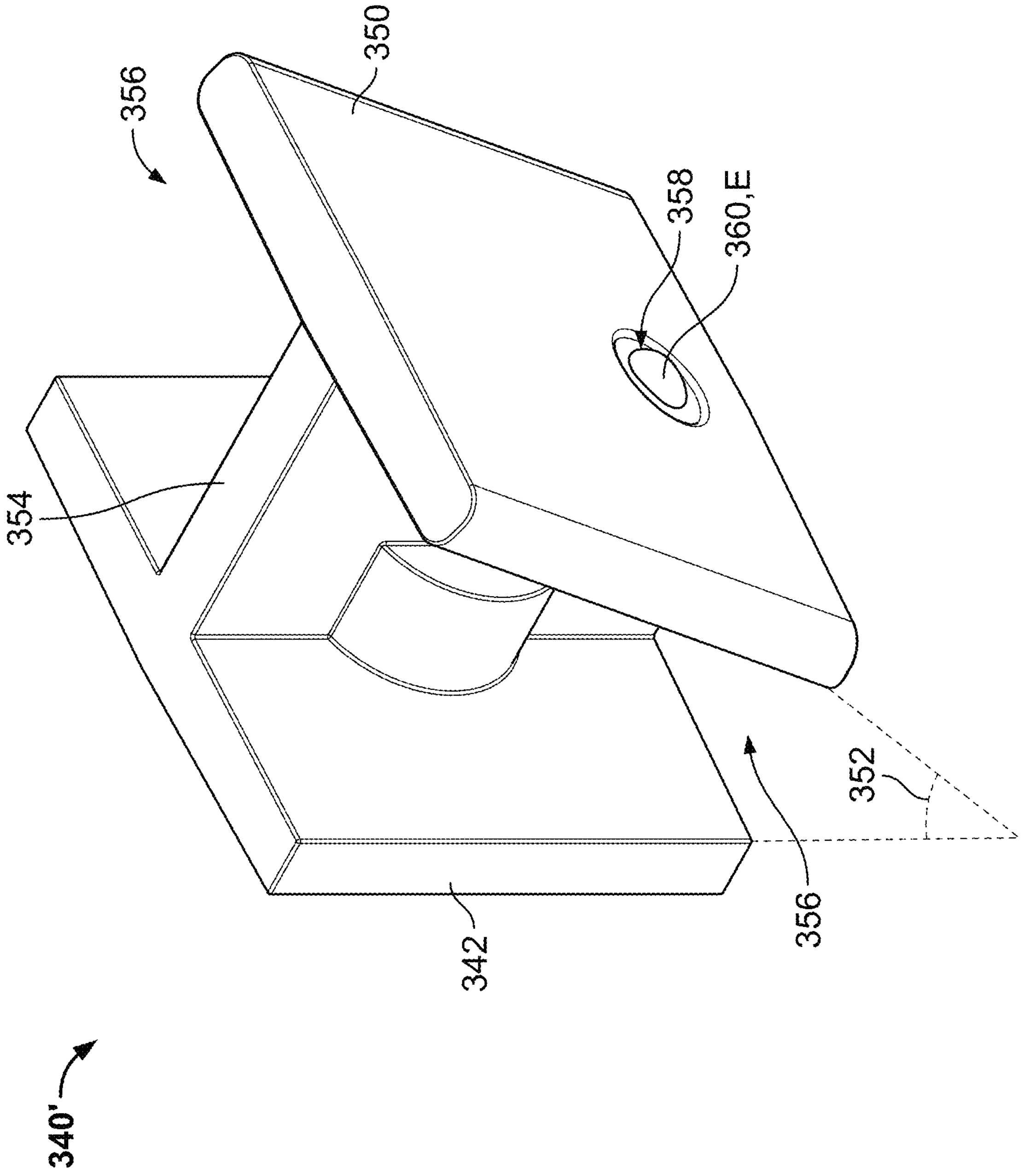
FIG. 15 is a perspective view of a dock of the feeder assembly of FIG. 13.

A bird feeder 100' according to another embodiment, for example, is shown in FIGS. 13-15 and is capable of using the same camera module 200 with a slight variation in the dock 340 of the camera mount 300. In a feeder assembly 10' shown in FIGS. 13-15, the bird feeder 100' is a hummingbird feeder. Like references refer to like elements and primarily the differences from the embodiment shown in FIGS. 1-12 will be described in detail hereafter.

As shown in FIGS. 13 and 14, the bird feeder 100' has a housing 400 that includes a frame 410 having a top portion 412, a base portion 414, and a panel 416 connecting the top portion 412 and the base portion 414. The top portion 412 and the panel 416 are each planar members in the shown embodiment. The base portion 414 receives a feed container 420, which contains a nectar or other liquid for feeding hummingbirds.

A plurality of feed ports 430 are positioned on the feed container 420, as shown in FIGS. 13 and 14. The feed ports 430 each include a flower-shaped element 432 that has a passageway extending into the feed container 420 and a perch 434 connected to and extending from the flower-shaped element 432.

The camera module 200 of the embodiment of FIGS. 13 and 14 is the same as described in the embodiment of FIGS. 1-12 above and has the same cleat 310 as described in the embodiment above.

The dock 340' of the camera mount 300 in the hummingbird embodiment differs, as shown in FIG. 15, primarily in the angle of the second plate 350 with respect to the first plate 342. In this embodiment, instead of extending parallel to the first plate 342 as in FIG. 5, the second plate 350 extends at a second plate angle 352 with respect to the first plate 342. The second plate angle 352 differs in various embodiments and applications and is selected such that the camera angle 240 in the connected position C, shown in FIG. 14, is the fixed camera angle described above that is optimal for viewing birds accessing the feed ports 430 of the particular bird feeder 100'. In the embodiment of FIGS. 13-15 the second plate angle 352 is an acute angle that is approximately 30-45°. In other embodiments, the second plate angle 352 could be any fixed angle greater than 0° and less than 90°.

The camera module 200 is otherwise releasably fixed to the bird feeder 100' by the camera mount 300 in the same manner as described in the embodiment of FIGS. 1-12 above. The components and mounting of the camera mount 300 allow the same camera module 200 to be interchangeably used with different bird feeders 100, 100', increasing flexibility and decreasing costs for the user.

What is claimed is:

1. A camera mount for a bird feeder, comprising:

a dock fixed to the bird feeder, the dock has a detent mechanism including a detent ball and a spring biasing the detent ball into an extended position; and a cleat fixed to a camera module and slidable onto the dock in a sliding direction into a connected position, the detent ball engages a recess of the cleat in the connected position to releasably fix the cleat and the camera module to the dock.

2. The camera mount of claim 1, wherein the cleat has a base and a pair of arms extending from the base, the dock is received in a dock passageway defined by the arms.

3. The camera mount of claim 2, wherein the cleat has an open end at a first end of the arms and an end stop at an opposite second end of the arms, the dock is inserted into the open end and the arms slide along the dock into the connected position in which the end stop abuts the dock.

4. The camera mount of claim 2, wherein the base has the recess and a first electrical contact.

5. The camera mount of claim 4, wherein the dock has a second electrical contact that mates with the first electrical contact in the connected position.

6. The camera mount of claim 2, wherein the dock has a first plate, a second plate, and a web connecting the first plate to the second plate.

7. The camera mount of claim 6, wherein the arms are received in a receiving space formed around the web between the first plate and the second plate.

8. The camera mount of claim 6, wherein the dock has a detent passageway extending through the first plate, the second plate, and the web, the detent mechanism is positioned in the detent passageway.

9. The camera mount of claim 8, wherein the detent ball protrudes out of the detent passageway and beyond the second plate in the extended position.

10. The camera mount of claim 6, wherein the second plate is parallel to the first plate or extends at an acute angle with respect to the first plate.

11. The camera mount of claim 1, wherein the sliding direction is a linear direction.

12. The camera mount of claim 1, wherein the cleat is removable from the dock by only sliding the cleat in a direction opposite to the sliding direction.

13. A feeder assembly, comprising:

a bird feeder;

a camera module; and camera mount including a dock fixed to the bird feeder and a cleat fixed to the camera module, the dock has a detent mechanism including a detent ball and a spring biasing the detent ball into an extended position, the cleat is slidable onto the dock in a sliding direction into a connected position, the detent ball engages a recess of the cleat in the connected position to releasably fix the cleat and the camera module to the bird feeder.

14. The feeder assembly of claim 13, wherein the bird feeder has a housing with a perch assembly and a feed port accessible from the perch assembly, the perch assembly and the feed port are in view of the camera module in the connected position.

15. The feeder assembly of claim 14, wherein the camera module has a fixed orientation in the connected position.

16. The feeder assembly of claim 15, wherein the camera module is positioned at an acute camera angle with respect to a vertical direction in the fixed orientation.

17. The feeder assembly of claim 14, wherein the housing has a camera recess in an outer surface, the camera module is positioned in the camera recess in the connected position.

18. The feeder assembly of claim 17, wherein the housing covers the camera module on all sides except a front side with the camera module positioned in the camera recess.

19. The feeder assembly of claim 17, wherein the housing has a mount surface facing the camera recess, the mount surface is positioned at an acute mount angle with respect to a vertical direction and the dock is fixed to the mount surface.

20. The feeder assembly of claim 19, wherein the dock has a protrusion that is received in a mount opening in the mount surface to position the dock with respect to the mount recess.

21. The feeder assembly of claim 13, wherein the cleat is monolithically formed in a single piece with a body of the camera module.

22. The feeder assembly of claim 13, wherein the camera module includes a body containing a camera, a motion sensor, and a microphone.

23. The feeder assembly of claim 22, wherein the camera module has a wireless communication device wirelessly transmitting images captured with the camera and audio captured with the microphone.

24. The feeder assembly of claim 13, wherein the bird feeder is one of a plurality of different bird feeders, the camera module is interchangeably connectable to each of the plurality of different bird feeders by the camera mount.

* * * * *